Figure 1:
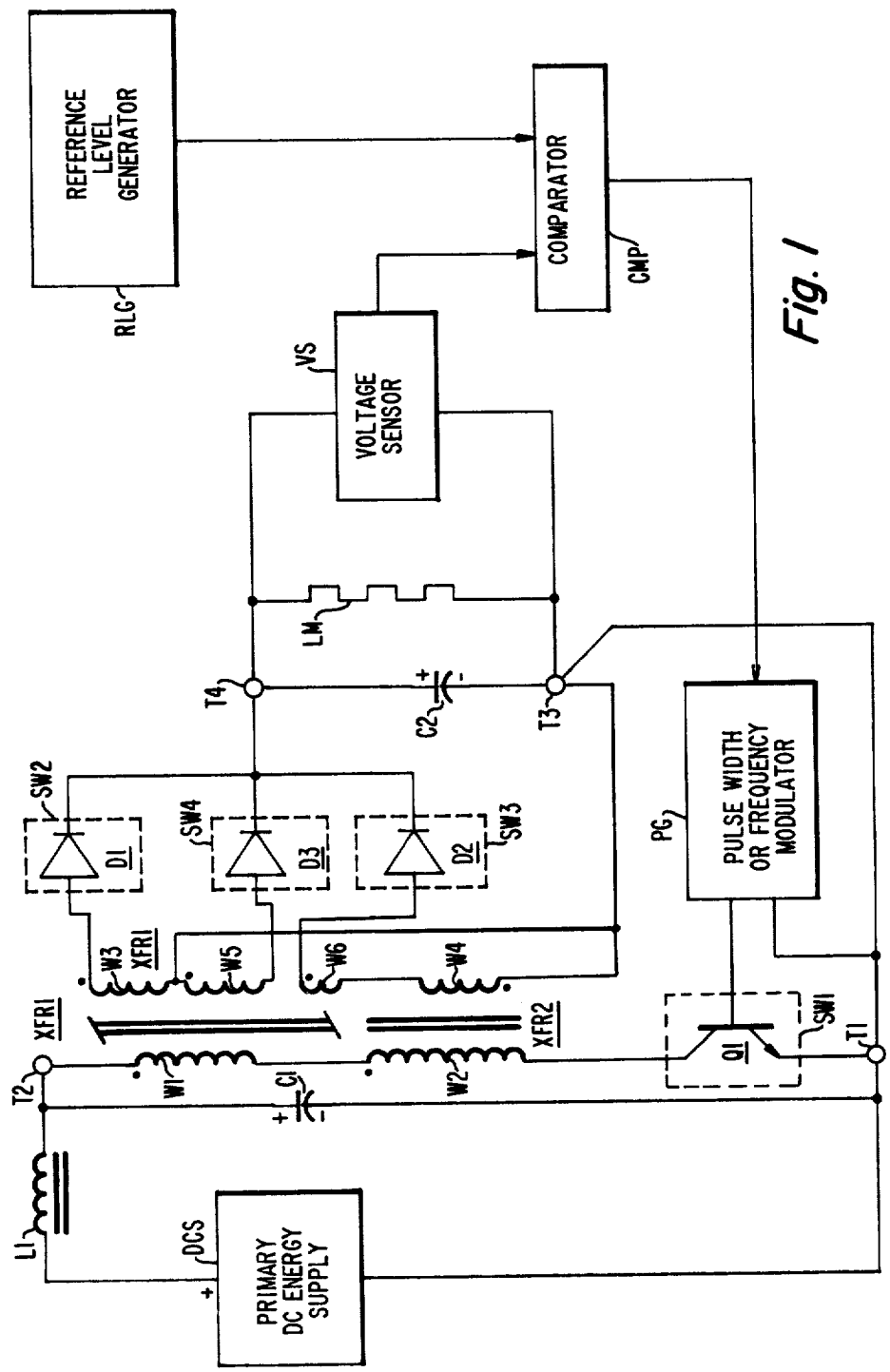

United States Patent [19]

Colton

[11] Patent Number: 4,481,565
[45] Date of Patent: Nov. 6, 1984

[54] CORE RESET FOR SINGLE-ENDED DC-TO-DC CONVERTER

[75] Inventor: Robert M. Colton, Philadelphia, Pa.
[73] Assignee: RCA Corporation, New York, N.Y.
[21] Appl. No.: 396,282
[22] Filed: Jul. 8, 1982
[51] Int. Cl.³ .......................................... H02M 3/335
[52] U.S. Cl. ........................................ 363/56; 363/21
[58] Field of Search .................... 363/18–21, 363/55–56, 95, 97, 131–132

[56] References Cited

U.S. PATENT DOCUMENTS 3,935,526 1/1976 Kamata et al. ................. 363/21

OTHER PUBLICATIONS

*Intersil Application Bulletin A035*, R. Severns, "Switch-mode Topologies Make Them Work For You" FIG. 50*b*, p. 18.
*Proceedings Powercon 8*, L. H. Dixon, Jr., "Designing Optimal Multi-Output Converters with a Coupled Inductor Current Driven Topology" FIG. 4*d*, E-4, p. 5.

*Primary Examiner*—Peter S. Wong
*Attorney, Agent, or Firm*—Joseph S. Tripoli; George E. Haas; Allen LeRoy Limberg

[57] ABSTRACT

Saturation is avoided in the core of the transformer used for direct conversion in a single-ended dc-to-dc converter of the type using auxiliary flyback conversion through a plural-winding inductor. This is done by resetting the core with a winding threading the core, through which winding the secondary current of the plural-winding inductor passes.

3 Claims, 2 Drawing Figures

CORE RESET FOR SINGLE-ENDED DC-TO-DC CONVERTER

The Government has rights in this invention pursuant to contract No. DAAK80-81-C-0054 awarded by the U.S. Department of the Army.

The present invention relates to dc-to-dc converters of a single-ended switching type and, more particularly, to a modification of such converters to avoid magnetization of the converter transformer.

The invention is embodied in a dc-to-dc converter of a type described by Duard Lee Pruitt in his U.S. patent application Ser. No. 223,495, now U.S. Pat. No. 4,408,267 issued Oct. 4, 1983, entitled DC-TO-DC SWITCHING CONVERTERS and assigned to RCA Corporation transformer and of a plural winding inductor or flyback transformer are selectively connected across a primary energy source by an electrically controllable primary switch means, such as a transistor. The secondary winding current of the conventional transformer, which flows during conduction of the primary switch means, is rectified to provide a first component of converter output current. The secondary winding current of the flyback transformer, which flows when conduction of the first switch means is interrupted, is rectified to provide a second component of output current. These two components of current combine to provide a non-pulsating output current from the converter. Conventional transformer action is used to convert a substantial portion of the power in order to allow reduction in size of the flyback transformer, which has to have sufficient magnetic core material to provide the inductance for energy storage. Flyback transformer action facilitates switched regulation of output voltage or current.

A problem is encountered with this type of converter when the undirectional pulses of current applied to the primary winding of the conventional transformer cause the core to become magnetized to point of saturation. This inhibits the flux changes required to sustain conventional transformer action, and the flyback transformer has to assume a greater portion of the conversion load. To accommodate this possibility the flyback transformer would have to be provided with a large core to provide for the increased energy storage requirement and to avoid saturation of its core magnetization. Otherwise, the tendency for short circuitry in the primary windings of the transformers as saturation of core magnetization progresses tends to cause excessive currents to flow through those windings and the primary switch means. Where the primary switch means is a semiconductor device, the excessive current can lead to damage or destruction of the device. This problem is most evident where the core of the conventional transformer has substantial hysteresis in its B-H characteristic, as tends to be the case with the high-permeance core materials one wishes to use to lighten the weight of the conventional transformer.

This problem is solved in the present invention by routing flyback transformer secondary winding current, which flows during intervals the primary switch means is non-conductive, through a secondary winding on the conventional transformer to reset its core.

Figure 2:
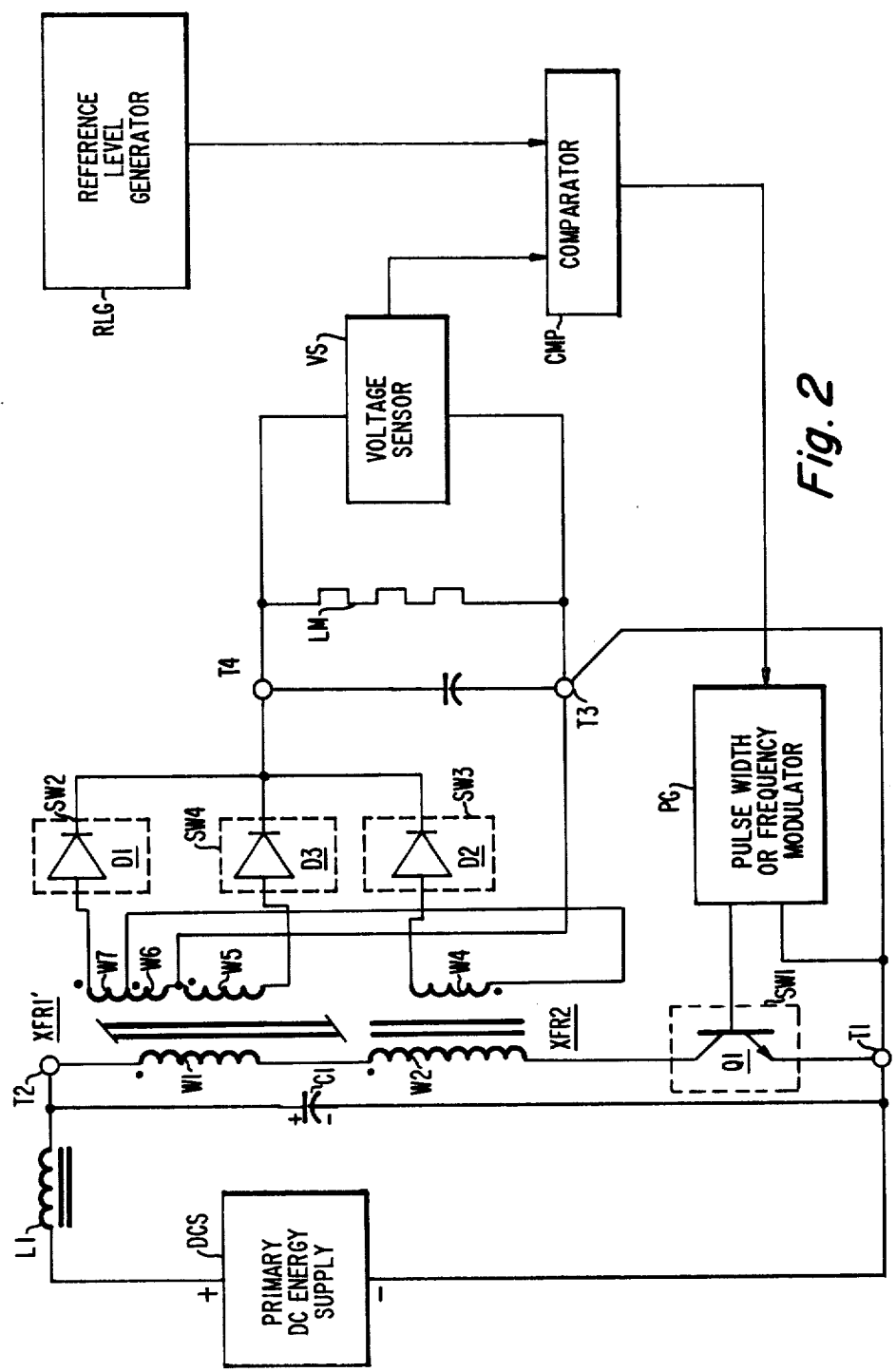

In the drawing:

Each of FIGS. 1 and 2 is a schematic diagram of a dc-to-dc converter embodying the present invention.

In the FIG. 1 dc-to-dc converter a primary d-c energy supply DCS applies relatively negative and relatively positive operating potentials to a first terminal T1 and to a second terminal T2, respectively. T1 and T2 are the input terminals of a dc-to-dc switching converter having a third terminal T3 and a fourth terminal T4 as its output terminals. In the particular arrangement shown, terminal T3 is connected by direct connection to terminal T1, so input voltage at terminal T2 and output voltage at terminal T4 are referred to the same common voltage at terminals T1 and T3. The primary d-c energy supply DCS might connect directly between terminals T1 and T2. However, the input current demand of the dc-to-dc switching converter is pulsating in nature; and connection via a smoothing filter such as series choke L1 and shunt capacitor C1 places more constant loading on the primary d-c energy supply, which generally aids regulation of the converter output voltage between terminals T3 and T4.

First switch means SW1 recurrently connects the primary windings W1 and W2 of a first transformer XFR1 and a second transformer XFR2 in series between terminals T1 and T2. This first switch means SW1 is shown, by way of example, as comprising an NPN transistor Q1 with emitter connected at terminal T1 and with collector connected via the primary windings W2 and W1 serially connected to terminal T2. The order of arrangement of the windings W1 and W2 can be reversed without affecting circuit operation; and the location of switching means SW1 in its series connection with those windings is, of course, chosen for convenience in the application of signals between the emitter and base electrodes Q1 to control the conduction between its collector and the emitter electrodes. (Where the output circuit between terminals T3 and T4 referred in potential to terminal T2 rather than T1, for example, it would be more convenient to use as first switching means a PNP transistor with emitter at terminal T2 and collector connected to terminal T1 via the primary windings W1 and W2.)

Transformer XFR1 has a secondary winding W3 with a first end continuously connected to terminal T3 and with a second end selectively connected to terminal T4 by a second switch means SW2, which conducts essentially simultaneously with switch means SW1. The simplest form, probably, switch means SW2 can take is a diode D1, poled to be unilaterally conductive responsive to the winding W3 current, induced in response to the flow of current through the winding W1 when switch means SW1 is conductive. That is, transformer XFR1 exhibits normal transformer action without storing energy, responding to the flow of current through switch means SW1 to deliver current to load means LM and to smoothing capacitor C2.

Transformer XFR2, on the other hand, is a flyback transformer operating to build up the filed surrounding its primary winding W2, so as to store energy, during the conduction of switch means SW1. To further this build-up, the secondary winding W4 of XFR2 has its first end selectively connected by third switch means SW3 to terminal T4 only at such times as switch means SW1 is non-conductive, the second end of winding W4 being continuously connected at terminal T3. The simplest form, probably, switch means SW3 can take is a diode D2, poled to be unilaterally conductive only when the field in the primary winding W2 of flyback transformer XFR2 is collapsing.

Output current is, then, continuously supplied from terminal T4, via normal transformer action of XFR1 and conduction of switch means SW2 during conduction of switch means SW1 to connect the primary windings W1 and W2 of XFR1 and XFR2 between terminals T1 and T2, and via flyback transformer action of XFR2 and conduction of switch means SW3 when switch means SW1 is no longer conductive. A feature of the circuitry thusfar described is that the series connection of the primary windings W1 and W2 of transformers XFR1 and XFR2 assures that the current flows in their primary windings track. So, supposing their primary-to-secondary-winding turns ratios to be the same, by Lenz's Law the alternate current flows from their secondary windings W3 and W4 assure a substantially constant flow of current to the load means LM. This is important since it reduces the ripple content of the power delivered to the load means LM and makes the task of regulating the voltage across or current through load means LM considerably less difficult. This is particularly so where switching regulation is employed, controlling the on-time to off-time ratios of the selective connections afforded by conduction of switch means SW1, SW2 and SW3.

The conduction of switch means SW1 can be controlled in a variety of ways. FIG. 1 shows a voltage sensor VS arranged to respond to the d-c to d-c switching converter output voltage between terminals T3 and T4 for controlling the duration or repetition rate (or both) of pulses applied by a pulse generator PG to the base of transistor Q1 to switch Q1 into conduction. That is, more particularly pulse generator PG may be either a pulse width modulator or a pulse frequency modulator. Such an arrangement forms a switching voltage regulator. As the sensed voltage increases above a prescribed reference voltage, there is a decrease in the duration or repetition rate (or both) of the pulses from the pulse generator PG that switch Q1 into conduction. A pulse width modulator may, for example comprise a direct-potential-controlled assymmetrical astable multivibrator. A pulse frequency modulator, on the other hand, may by way of example, comprise a direct-potential-controlled monostable multivibrator, or one-shot. The details of the design of the sensor VS and such multivibrators are, of course, familiar matters to those skilled in the art of switching voltage regulator design.

The selection of the factor n/m, the turns ratios of the secondary windings of W3 and W4 transformers XFR1 and XFR2 to their respective primary windings W1 and W2, is made as follows, supposing output current pulsations are to be minimized. The desired direct potential output is divided by the minimum value of the direct potential available for conversion, which quotient is then divided by the maximum duty cycle afforded by the pulse generating means PG—that is, by the on-time to off-time ratio of the pulses supplied to switch the switch means SW1 into conduction—to obtain n/m. The elements VS, RLG, CMP and PG are conventionally provided by a monolithic integrated circuit such as the SG 1524, SG 2524 or SG 3524 manufactured by Texas Instruments, Inc., Dallas, Tex. Each of these i-c's uses a pulse width modulator of the type in which the voltage to be regulated is sensed and compared to the output voltage of a sawtooth oscillator to generate pulses of a width dependent on the sensed voltage. The maximum duty cycle one seeks such apparatus to provide has a typical value of around 50%, in which case n/m will be about twice the ratio of the desired direct potential output divided by the minimum available direct potential to be converted.

When switch means SW1 is non-conductive, a flyback voltage will tend to be generated on the primary windings W1 and W2 of transformers XFR1 and XFR2. The flyback voltage on the primary winding of transformer XFR2 is constrained by the clamping of its secondary winding to output voltage between terminals T3 and T4 as switch means SW2 conducts. There is a tendency for the flyback voltage across primary winding W1 to become large enough to impose excessive open-circuit emitter-to-collector voltage on transistor Q1 in switch means SW1, however. This tendency can be checked by clamping an auxiliary winding W5 of transformer XFR1 to the output voltage between terminals T3 and T4 during the times switch means SW1 is non-conductive. A switch means SW4, which may comprise a properly poled diode D3 by way of example, can be used to selectively connect auxiliary winding W5 between terminals T3 and T4 at these times. The turns ratio m/p of winding W1 to winding W5 is chosen so that (m/p) times the output voltage as added to the voltage between terminals T1 and T2 and to m/n times the output voltage reflected to the primary winding W2 will not exceed the open-circuit emitter-to-collector breakdown voltage of transistor Q1. This clamping arrangement allows recovery of the energy otherwise lost to the clamp. Alternatively, transformer XFR2 may be modified to use an auxiliary winding bifilar wound with its primary winding and selectively connected across the primary energy supply DCS or capacitor C1 to clamp the flyback voltage across primary winding W1, though to make this work well the auxiliary winding reverse-EMF exceeds the primary energy supply voltage impressed between terminals T1 and T2. In applications where the energy recoverable by the foregoing methods is considered to be insignificant, power-dissipative "snubber" circuitry may be employed—e.g., a series connection of resistor and d-c blocking capacitor can be connected across the serially connected primary windings of the two transformers. Resistors may be placed across the transformer secondary windings to damp ringing, as well.

The operation of the converter as thus far described is similar to that described in U.S. Pat. No. 4,408,267. The FIG. 1 dc-to-dc converter, however, uses core material with square loop B-H curve (e.g., SUPERMALLOY$_{TM}$); and the unidirectional pulse currents flowing in response to conduction of primary switch means SW1 undesirably tend to move the operating point on the B-H curve to one of magnetic saturation. This tendency is countered in accordance with the present invention by including a further winding W6 of transformer XFR1 in the selective connection of winding W4 of transformer XFR2 between terminals T3 and T4 responsive to conduction of switch means SW3. During the times switch means SW1 is non-conductive, secondary current flow from winding W4 of flyback transformer XFR2 flows through winding W6 of transformer XFR1 in a direction tending to demagnetize the core of transformer XFR1.

The number of turns in winding W5 is chosen to obtain magnetization levels where there is a sufficient reversal of flux in the core that it can be returned at least to its original non-magnetized state or that there can be a stronger flux reversal to leave the core in a magnetized state opposite in sense to that brought about by conduction of switch means SW1. One can get from full saturation in the normal flux direction to from 60% to almost 70% of saturation in this reverse flux direction, at 50% duty cycle for switch means SW1, while avoiding output current pulsations. This reduces the core size required of transformer XFR1 and provides a wide range of tolerance to variations in forward flux conditions encountered during regulation. The number of turns that winding W6 can have is limited by the desire that flyback voltage thereacross be smaller than across winding W4, so that diode D2 switches properly, and by the desire not to buck out the control of primary winding W1 flyback voltage provided by selectively clamping winding W5 to the output voltage between terminals T3 and T4.

In FIG. 1 the order of the series connection of winding W3 and switch means SW2 between terminals T3 and T4 is immaterial, and so is the order of the series connection of winding W5 and switch means SW4. The order of the series connection of windings W4 and W6 and of switch means SW3 between terminals T3 and T4 is immaterial also.

FIG. 2 shows how this last observation leads to the variant of FIG. 1 wherein winding W3 is provided by supplementing winding W6 with additional winding W7, windings W3 and W7 being in autotransformer relationship with each other. The order of series connection of winding W4 and switch means SW3 can, of course, be reversed from that shown.

What is claimed is:

1. In a direct-current to direct-current converter of the type using:
    first and second terminals for connection of a primary dc energy supply therebetween;
    third and fourth terminals for connection of a load therebetween;
    a first transformer with primary winding and a first and second secondary windings;
    a second, flyback transformer with primary winding and a secondary winding;
    first switch means for selectively completing during a first series of time intervals a series connection of the primary windings of said first and second transformers between said first and second terminals, said first series of time intervals being interspersed with a second series of time intervals;
    second switch means for selectively completing during said first series of time intervals a first connection between said third and fourth terminals through the first secondary winding of said first transformer; and
    third switch means for selectively completing, during said second series of time intervals, a second connection between said third and fourth terminals through the secondary winding of said second transformer;
    the improvement wherein said second secondary winding of said first transformer is included in said second connection between said third and fourth terminals for counteracting the undesirable tendency towards magnetic saturation in said first transformer.

2. An improved d-c to d-c converter as set forth in claim 1 wherein said second secondary winding of said first transformer is excluded from said first connection between said third and fourth terminals.

3. An improved d-c to d-c converter as set forth in claim 1 wherein said second secondary winding of said first transformer is included in said first connection between said third and fourth terminals.

* * * * *